(12) United States Patent
Backer et al.

(10) Patent No.: US 8,831,963 B2
(45) Date of Patent: Sep. 9, 2014

(54) ELECTRONIC QUEUING SYSTEMS AND METHODS

(75) Inventors: Alejandro Backer, Altadena, CA (US); Timothy Ross McCune, Santa Monica, CA (US)

(73) Assignee: AB Inventio, LLC, Altadena, CA (US)

( * ) Notice: Subject to any disclaimer, the term of this patent is extended or adjusted under 35 U.S.C. 154(b) by 186 days.

(21) Appl. No.: 13/157,254

(22) Filed: Jun. 9, 2011

(65) Prior Publication Data

US 2011/0307547 A1 Dec. 15, 2011

Related U.S. Application Data

(63) Continuation-in-part of application No. 11/941,849, filed on Nov. 16, 2007.

(60) Provisional application No. 60/893,644, filed on Mar. 8, 2007, provisional application No. 61/353,638, filed on Jun. 10, 2010.

(51) Int. Cl.
G06Q 10/00 (2012.01)
G06Q 10/02 (2012.01)

(52) U.S. Cl.
CPC ........................... G06Q 10/02 (2013.01)
USPC ............................................................. 705/5

(58) Field of Classification Search
USPC ............................................. 705/5–6, 14.49
See application file for complete search history.

(56) References Cited

U.S. PATENT DOCUMENTS

| | | | | |
|---|---|---|---|---|
| 4,885,780 A | * | 12/1989 | Gopal et al. | 379/221.01 |
| 5,781,894 A | * | 7/1998 | Petrecca et al. | 705/14.4 |
| 5,996,007 A | * | 11/1999 | Klug et al. | 705/14.73 |
| 6,058,435 A | * | 5/2000 | Sassin et al. | 719/331 |
| 6,161,097 A | * | 12/2000 | Glass et al. | 705/6 |
| 6,317,686 B1 | * | 11/2001 | Ran | 701/533 |
| 6,529,786 B1 | * | 3/2003 | Sim | 700/90 |
| 6,845,361 B1 | * | 1/2005 | Dowling | 705/5 |
| 7,383,200 B1 | * | 6/2008 | Walker et al. | 705/7.15 |
| 7,454,478 B1 | | 11/2008 | Rosselli et al. | |
| 2002/0007292 A1 | | 1/2002 | Paxton et al. | |
| 2002/0062236 A1 | * | 5/2002 | Murashita et al. | 705/5 |
| 2002/0116235 A1 | | 8/2002 | Grimm et al. | |
| 2002/0116266 A1 | * | 8/2002 | Marshall | 705/14 |
| 2002/0178034 A1 | * | 11/2002 | Gardner et al. | 705/5 |
| 2003/0010822 A1 | | 1/2003 | Davies et al. | |

(Continued)

FOREIGN PATENT DOCUMENTS

WO 2005/124699 12/2005

OTHER PUBLICATIONS

Rafaeli, et al., The Effects of Queue Structure on Attitudes, J. of Service Res., vol. 5, No. 2, Nov. 2002, pp. 125-139.*

(Continued)

*Primary Examiner* — Daniel Vetter
(74) *Attorney, Agent, or Firm* — Steinfl & Bruno LLP

(57) ABSTRACT

The present disclosure describes methods and systems of allowing entities to create virtual queues that correspond to actual queue in an electronic queue-managing system, and allowing individuals to join the virtual queues using electronic devices (e.g., cell phone technology, wireless network communication technology). The queue-managing system updates the virtual queues based on information from an entity. The queue-managing system also sends messages and notifications of updated status of the virtual queues to the user periodically, automatically or in response to the user's request.

57 Claims, 11 Drawing Sheets

(56) References Cited

U.S. PATENT DOCUMENTS

| | | | |
|---|---|---|---|
| 2003/0039350 A1 | 2/2003 | Holmen | |
| 2003/0065805 A1 | 4/2003 | Barnes, Jr. | |
| 2003/0074276 A1 | 4/2003 | Sato | |
| 2003/0224765 A1 | 12/2003 | Udagawa et al. | |
| 2004/0148207 A1* | 7/2004 | Smith et al. | 705/6 |
| 2004/0158482 A1 | 8/2004 | Hale et al. | |
| 2004/0225540 A1 | 11/2004 | Waytena et al. | |
| 2005/0027543 A1* | 2/2005 | Labrou et al. | 705/8 |
| 2005/0047576 A1* | 3/2005 | Hidesawa et al. | 379/215.01 |
| 2005/0085226 A1 | 4/2005 | Zalewski et al. | |
| 2007/0286220 A1* | 12/2007 | Stenning | 370/412 |
| 2008/0040172 A1 | 2/2008 | Watkins | |
| 2008/0080445 A1 | 4/2008 | Bayne et al. | |
| 2008/0133283 A1 | 6/2008 | Backer et al. | |
| 2008/0195471 A1* | 8/2008 | Dube et al. | 705/14 |
| 2012/0004961 A1* | 1/2012 | Flynn | 705/14.5 |

OTHER PUBLICATIONS

Rafaeli, et al., Queues and Fairness: A Multiple Study Experimental Investigation, Technion-lsrael Institute of Technology, Tech. Rep., 2003.*

Raz, et al., Classes, Priorities and Fairness in Queuing Systems, RUTCOR, Rutgers University, Tech. Rep. RRR-21-2004, 2004.*

Non-Final Office Action issued for U.S. Appl. No. 11/941,849, filed Nov. 16, 2007 in the name of Alejandro Backer et al. mail date: Nov. 10, 2009.

Non-Final Office Action issued for U.S. Appl. No. 11/941,849, filed Nov. 16, 2007 in the name of Alejandro Backer et al. mail date: Feb. 22, 2011.

Final Office Action issued for U.S. Appl. No. 11/941,849, filed Nov. 16, 2007 in the name of Alejandro Backer et al. mail date: Sep. 7, 2011.

Final Office Action issued for U.S. Appl. No. 11/941,849, filed Nov. 16, 2007 in the name of Alejandro Backer et al. mail date: Jun. 1, 2010.

Advisory Action issued for U.S. Appl. No. 11/941,849, filed Nov. 16, 2007 in the name of Alejandro Backer et al. mail date: Sep. 13, 2010.

PCT International Search Report mailed on Sep. 7, 2012 for PCT/US2012/041762 filed on Jun. 8, 2012 in the name of AB Inventio, LLC et al.

PCT Written Opinion mailed on Sep. 7, 2012 for PCT/US2012/041762 filed on Jun. 8, 2012 in the name of AB Inventio, LLC et al.

* cited by examiner

5 Minutes – 60+ Minutes
Model is less sophisticated, but rotations can be inscreased or descreased based on overall depth of the queue. Heavy rotation on a busy day costs more than light rotation on small queue day.

ELECTRONIC QUEUING SYSTEMS AND METHODS

CROSS REFERENCE TO RELATED APPLICATIONS

The present application is a continuation-in-part of U.S. patent application Ser. No. 11/941,849 filed on Nov. 16, 2007 which, in turn, claims priority to U.S. Provisional Application No. 60/893,644 filed on Mar. 8, 2007. The present application also claims priority to U.S. Provisional Application No. 61/353,638 filed on Jun. 10, 2010. All aforementioned references are incorporated herein by reference in their entirety.

FIELD

The present disclosure is directed to facilitating a process of having people wait in line for an event, an attraction, a facility, or service. Moreover, it relates to electronic queuing systems and methods.

BACKGROUND

Every day, millions of people waste their precious time standing in line. Queues (or "lines") are an old and outdated system to apportion goods or services in limited supply to demand that is at times larger than supply. Why do queues work at all? Why don't they grow forever? They exploit two principles: first, they smooth demand across time, by moving it from peak times to other times. Second, they create a negative feedback loop, reducing demand during peak times by raising the cost (in wait time) of service in proportion to current demand, making it increasingly unattractive for customers to join the queue as it grows longer. But queues which force customers to stand in line suffer from multiple problems. First, they waste people's time which could be better spent. Second, they discourage transfer of demand from a long queue to a shorter one, by failing to provide information on the length of other queues.

U.S. Pat. No. 6,529,786 to Sim (hereafter "Sim") describes a queue management system which comprises a plurality of portable modules, at least one docking station, a queue manager, signal transmitting means, at least one module detector and a communication means. Each portable module includes a memory means containing a unique identification code, an indicator means, transmitter means for transmitting the identification code over a short range, and docking means for downloading the identification code. The docking station registers the person in a queue by downloading the identification code for the portable module when docked. The queue manager maintains the queue sequence for each queue and includes a communication means for receiving the downloaded code. The signal transmitting means is associated with the queue manager for transmitting the signals to each portable module to instruct the person carrying the portable module to join the queue. The module detector detects transmitted identification codes from any portable module in its vicinity. The module detector is arranged at the queue to detect when the person carrying the portable module joins the queue. Finally, the communication means is arranged between the queue manager and the module detector to communicate any detected identification code to the queue manager. However, the system and method of Sim appears to require that the people wanting to join the queue be given special portable modules that are specially constructed for use with Sim's invention.

U.S. Pat. No. 6,748,364 to Waytena et al. (hereafter "Waytena") describes a system and a method for assigning and managing patron reservations for one or more attractions by receiving reservation requests with personal communication devices (PCDs). Reservation requests are transmitted to a computer associated with the selected attraction, which determines a proposed reservation time based on information describing the attraction, the patron, previously-made reservations maintained in a virtual queue, and the current state of a physical queue associated with the attraction. Proposed reservation time is transmitted to the PCD for confirmation or rejection by the patron. Confirmed reservations are entered in the virtual queue. Patrons are alerted by the PCD when their reservation time is approaching. Like Sim above, the system of Waytena appears to require the people wishing to join the queue to possess specially adapted personal communication devices.

U.S. Pat. No. 6,845,361 to Dowling (hereafter "Dowling") describes a method and a system are provided for maintaining a virtual-wait queue that controls access by customers to a physical resource such as a restaurant table. The method and system are especially adapted for use by customers operating Internet-enabled wireless devices. The system operates by maintaining a virtual-wait queue data structure capable of storing a plurality of entries. Each entry is representative of a customer. The system accepts an instruction from a premises I/O device indicating to either add or delete an entry to the data structure. The system also accepts an instruction from a network connection to either add or delete the remote customer into or from the virtual wait queue. The virtual wait queue system indicates to the remote customer the estimated time left in the queue, freeing the customer from the need to wait in line. While the wireless devices of Dowling do not have to be specially adapted (as they were in Sim or Waytena), they do appear to need to be Internet-enabled, which is not yet a ubiquitous feature for cell phones.

U.S. Pat. No. 6,889,098 to Laval (hereafter "Laval") describes a method and system for managing admission to an attraction. In one or more embodiments, the system comprises a first queue by which customers may access the attraction by waiting in line and a second queue by which customers may access the attraction in a manner which avoids the first queue. The system includes a first validator for validating an entitlement of a customer to receive an assigned time in the future for accessing the attraction via the second queue, a media distributor for distributing a media to an entitled customer, the media including the assigned time at which the entitled customer is entitled to access the attraction in the future, and a second validator for validating the entitled customer access to the attraction at the time provided on the media. In accordance with a method of the invention, a customer may access an attraction in a manner which avoids standing in a first waiting line by verifying entitlement to utilize a second queue, obtaining a pass entitling the customer to access the attraction at a future time, and returning to the attraction at the future time and gaining access with the pass. In this method, the customer may leave the vicinity of the attraction between when the pass is issued and the future time at which the customer is entitled to access to the attraction. However, the method and system of Laval appears to require the distribution of physical passes with a then-determined access time.

U.S. Pat. No. 7,047,205 to Hale et al. (hereafter "Hale") describes a method and system for the loading of patrons at multiple attractions at an entertainment includes the first-in first-out line and a priority based line. A cellular telephone is used to obtain and claim priority status. In other forms different priorities are established based on where, when and the number of priority spaces required. Different hierarchies are established for computer controlling the different lines for multiple attractions in the entertainment environment. The system and method also provide for moving people from an area of concentration to other locations Like Laval, the Hale system and method appears to determine the time of event access at the point at which the patron requests entry into the queue. If the queue rate changes after that point, the patron's entry time is not changed unless they re-enter the queue.

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

According to a first aspect, a method for managing virtual queues adapted to correspond to actual queues is described, the method comprising: establishing a plurality of virtual queues on an electronic queue-managing system, the virtual queues adapted to correspond to actual queues; establishing a bi-directional communication means with an individual who wants to enter, has entered, or has left the plurality of virtual queues according to status of the virtual queues and a first set of rules; establishing a bi-directional electronic communication between the electronic queue-managing system and an entity that manages or provides one or more actual queues according to status of the virtual queues and a second set of rules; and updating the virtual queues according to information received from the individual and information from the entity, and a third set of rules.

According to a second aspect, a method for queuing an event or service is described, the method comprising: a user calling, texting or sending a request via an app to a queue system; the queue system identifying the user calling, texting or sending a request to the queue system; the queue system sending a message to the user, the message requesting the user to identify the event or service desired; the queue system identifying the event or service; the queue system adding the user to a virtual queue; and the queue system calling, texting or sending a notification via an app to the user and notifying the user when an estimated wait time in the virtual queue reaches a specified amount of time.

According to a third aspect, a method of coordinating a meeting is described, the method comprising: providing a first person; providing a second person, the first person and the second person desiring to meet each other; the first person sending a message to a queue-managing system to indicate availability or a desire to meet the second person; and the queue-managing system sending a message to the second person to inform the second person that the first person is available to meet.

According to a fourth aspect, a method of prioritizing questions at a Q and A session is described, the method comprising: providing a Q and A session; providing at least one speaker at the Q and A session; providing a plurality of attendees at the Q and A session; the attendees submitting a question by sending a message to a queue-managing system by using a cell phone; the queue-managing system assigning a code to each question and displaying the question and the code on display at the Q and A session; the attendees voting on the questions that the attendees desire to be addressed using cell phones, according to the code pertaining to each question; and the queue-managing system prioritizing the questions having a greater number of votes to be addressed before the questions having a lesser number of votes.

DETAILED DESCRIPTION

A. System Overview

Figure 1:
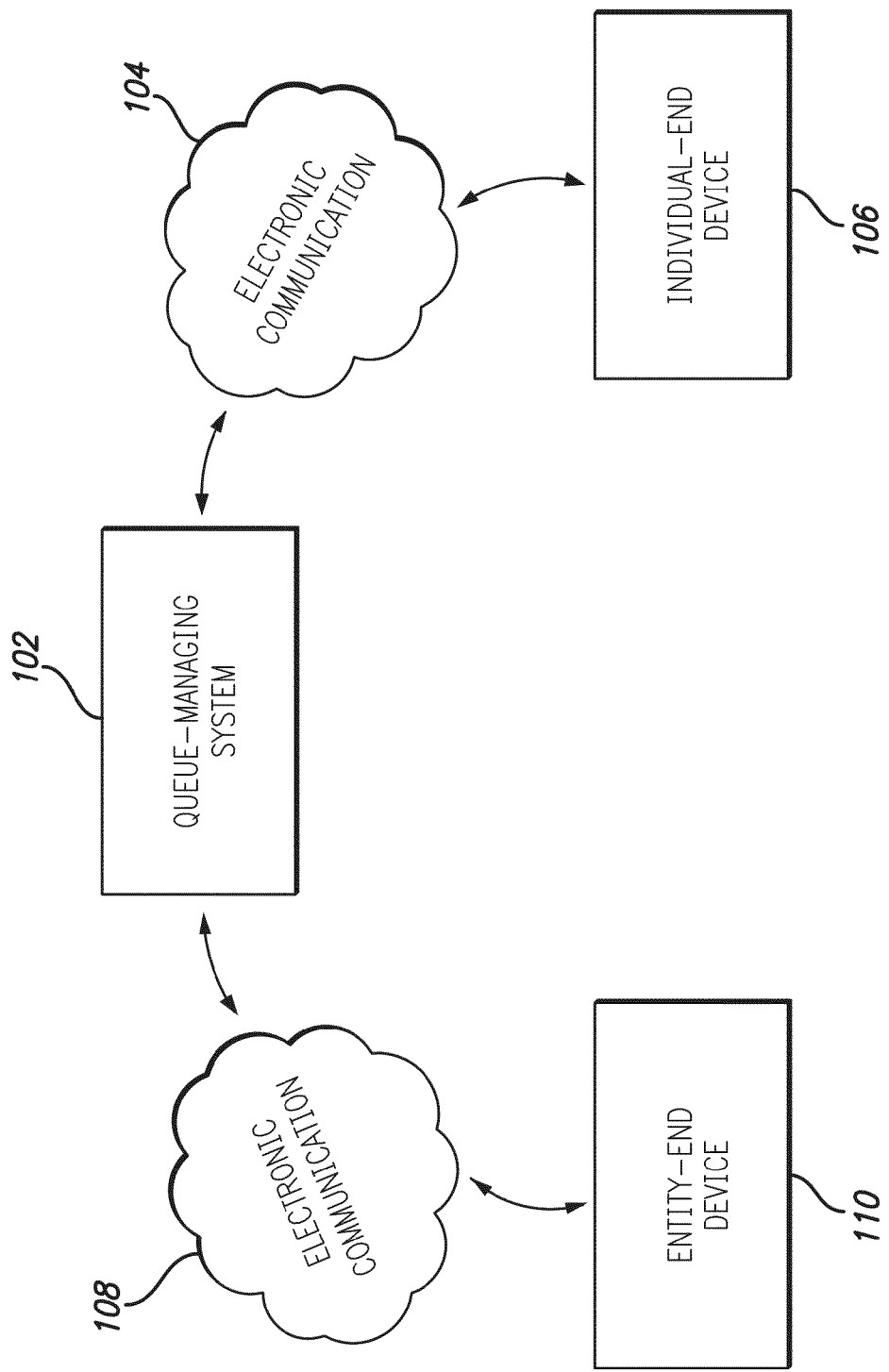
FIG. 1 depicts an overview of a queuing system.

The following is an example of the queue system in operation. FIG. 1 shows an overview of an embodiment of the queue system. The queue system comprises a queue-managing system (102), a plurality of individual-end devices (106) that communicate with the queue-managing system (102) via electronic communication (104), and a plurality of entity-end devices (110) that also communicate with the queue-managing system via electronic communication (108).

Figure 2:
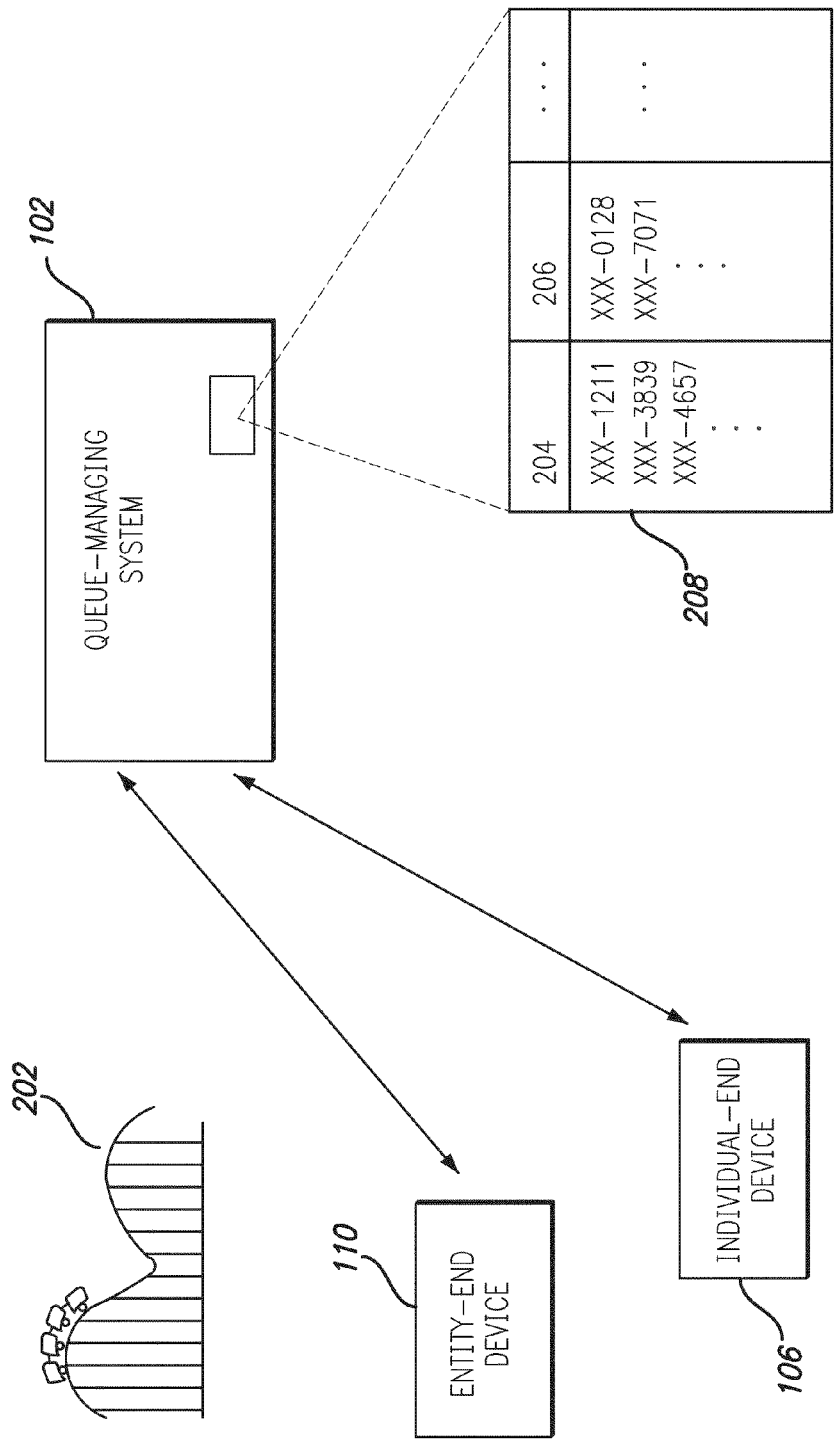
FIG. 2 depicts an exemplary operation of the queuing system.

FIG. 2 shows an example of the operation step by step. First, an entity creates a virtual queue (204) on the queue-managing system through an entity-end device (110) or through a server. The virtual queue (204) corresponds to the actual queue for a facility, an attraction or service (202) the entity manages or provides. Examples include queues at a DMV, at government offices, queues for a table at a restaurant, queues for service at a restaurant, telephone queues for people waiting to talk on the phone with someone, virtual queues for an online meeting, queues to pick up a car at valet parking, queues for hotel check-in, queues for casino games, queues for admission to shows and/or night clubs, theme park attractions, theme park admission, healthcare providers, emergency rooms, dentists, tax offices, salons, Santa Claus pictures at the mall, retail shops, colleges (e.g., admissions, financial aid, advisement, registration, etc.), questions at a Q&A sessions, queues to meet a person, queues at a fair, and many others.

After creating the virtual queue (204), the queue-managing system (102) can periodically send to the entity-end device (110) the information regarding the status of the virtual queue (204). The entity can send with the entity-end device (110) information related to the availability of the resource being queued for to the queue-managing system (102), and the queue-managing system (102) will update the virtual queue (204) accordingly.

A person or entity (e.g. a device or a machine) who wants to enter the virtual queue (204) sends with an individual-end device (106) a status request to inquire the length of the estimated wait time, or the number of people or parties in the virtual queue. Such person or entity can also request to join the virtual queue (204). The request contains a unique individual identification number or string of the person (208) or other individual-specific information. Third, the queue-management system (102) updates the virtual queue (204) according to the request and a set of rules. The update operation includes, among others, assigning a position in the virtual queue (204) to the individual identification number (208). The queue-managing system (102) usually assigns positions in the virtual queue (204) on a first-come-first-serve basis, but can assign such positions based on any business rule (e.g. priority pass holders can get priority), and there can be multiple priority tiers with different priorities. Rules can also restrict the number of queues that any given tier can enter at a time, or throughout the course of a day, or which queues the people can enter.

Fourth, when the entity advances the actual queue or changes the actual queue, the entity sends with the entity-end device (110) the relevant information to the queue-managing system (102). Upon receiving the information, the queue-managing system (102) updates the virtual queue (204) accordingly. The queue managing system (102) can also update the virtual queue (e.g., wait forecasts) due to passage of time in absence of any signal from the entity-end device (110).

Fifth, when the individual is near or at the front of the virtual queue (204), the queue-managing system (102) sends notifications to the individual-end device (106), which, in turn, alerts the individual to his queue status. The individual can specify with how much advance notice he would like to be notified, before he is near or at the front of the virtual queue (204). For example, the individual may be 10 minutes away so the individual may desire to be notified by the queue-managing system 10 minutes earlier than when he would normally be notified. The individual can also use a global positioning system (GPS) or a position-sensing device to be notified with the advance notice necessary to make it in time.

The individual may send with the individual-end device (106) a request to leave the virtual queue (204). The queue-managing system (102) will update the virtual queue (204) according to the request. From the moment the individual sends a request to enter the virtual queue (204) until a certain period after he leaves the virtual queue (204), the queue-managing system (102) periodically communicates with the individual-end device (106). According to the information received respectively, the queue-managing system (110) updates the virtual queue (204) and the individual-end device (106) notifies the individual. In addition, the queue-managing system (102) automatically updates the virtual queue (204) and other existing virtual queues according to a second set of rules.

An entity may subscribe to this system based on a "pay-as-you-go plan," under which the entity only pays for its usage of the system. To use this system, an entity does not have to install or purchase any hardware. The system may provide short message service (SMS) marketing services which an entity may choose to join, and an individual may choose to receive or reject such marketing SMS messages via an individual-end device. This system is adapted to work in all industries and work globally in multiple languages. An entity may sign up for the system's service through a web-based interface.

Figure 3:
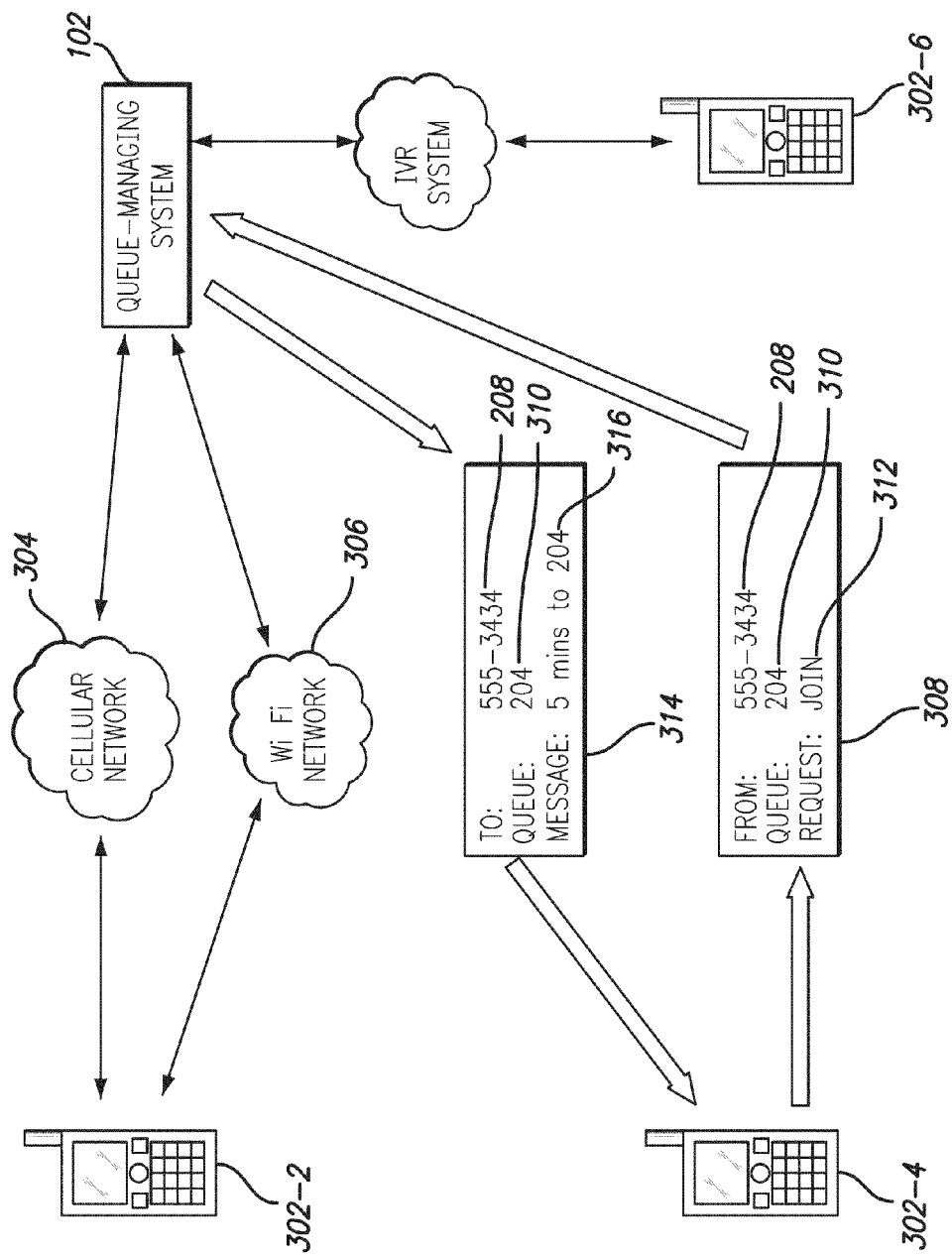
FIG. 3 depicts communications between a queue-managing system and cell phones.

B. The Individual-End Device and Communication Between the Individual-End Device and the Queue-Managing System
B1. Implementation of the Communication Between the Individual-End Device and the Queue-Managing System An embodiment of the individual-end device (106) is a cell phone (302) shown in FIG. 3. The communication between the cell phone and the queue-managing system (102) goes through a cellular network (304), WiFi network (306), or any other class of communication network.

An embodiment of the communication between the cell phone (302) and the queue-managing system (102) is text messaging (short message service, SMS or multimedia messaging service, MMS) or a related data communication protocol (308). A person can use a cell phone (302) to send a text message (308) to the queue-managing system (102). The message can contain a unique individual identification number of the person (208), which can be a phone number of the person and can be transmitted automatically in the caller ID header of the message, an identification string (e.g., a keyword or phrase) for the virtual queue (310), and a request code (312) (which can optionally be blank). The request code (312) indicates an individual's requests for updated status of the virtual queue, entering or leaving the virtual queue, etc. The queue-managing system (102) sends text messages (314) to the cell phone automatically or in response to the individual's request. The text message (314) from the queue-managing system (102) may optionally contain a unique individual identification number of the person (208), an identification number of the virtual queue (310), and a short text (316) that answers the person's request, describes the updated status of the virtual queue, alerts the person to his position in the virtual queue, etc. Subsequent requests can optionally lack the identification string for the virtual queue (310) since the system already knows which queue the person is in, if the person is already in only one virtual queue.

Figure 4:
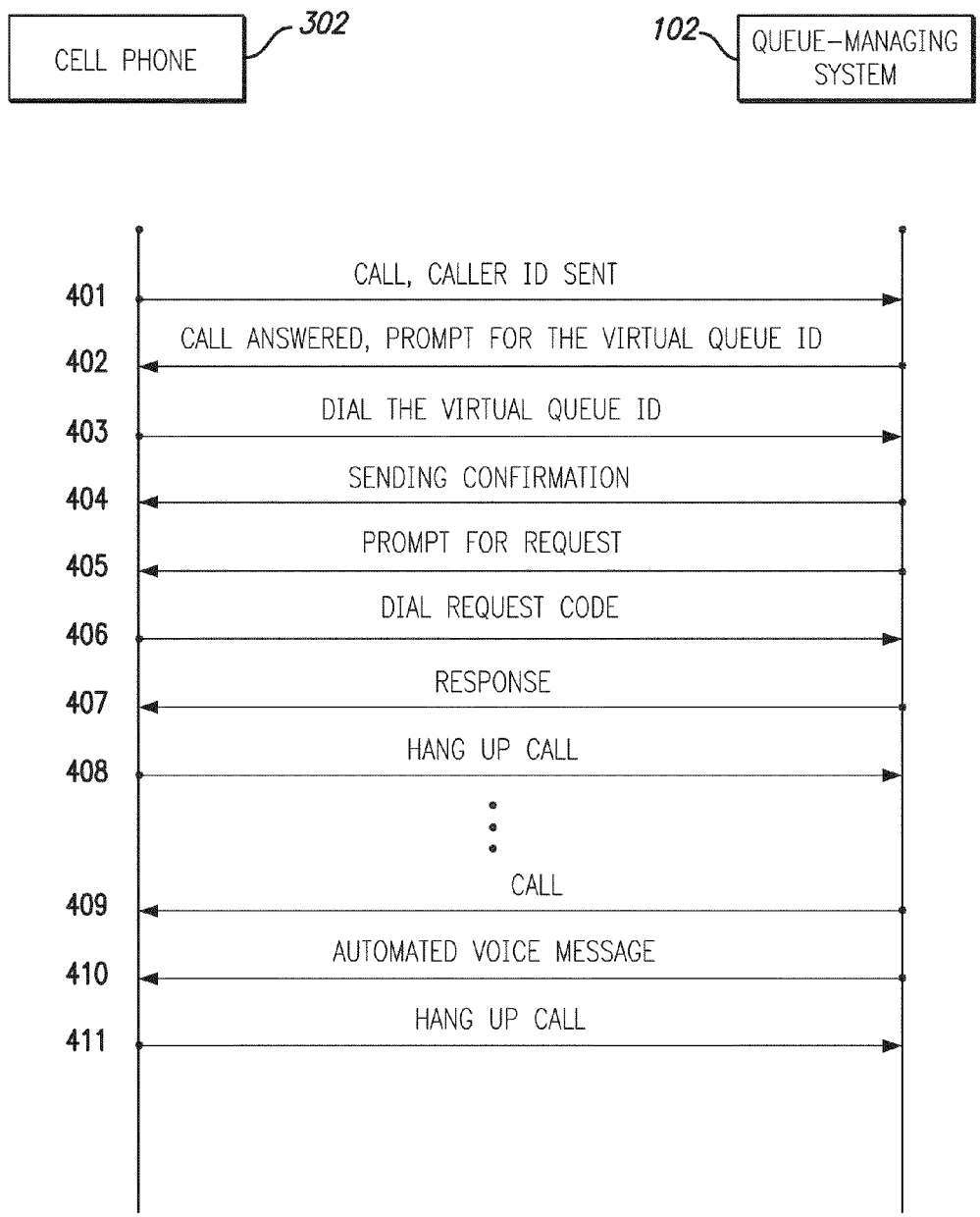
FIG. 4 depicts a general operation of an interactive voice response (IVR) system.
Figure 5:
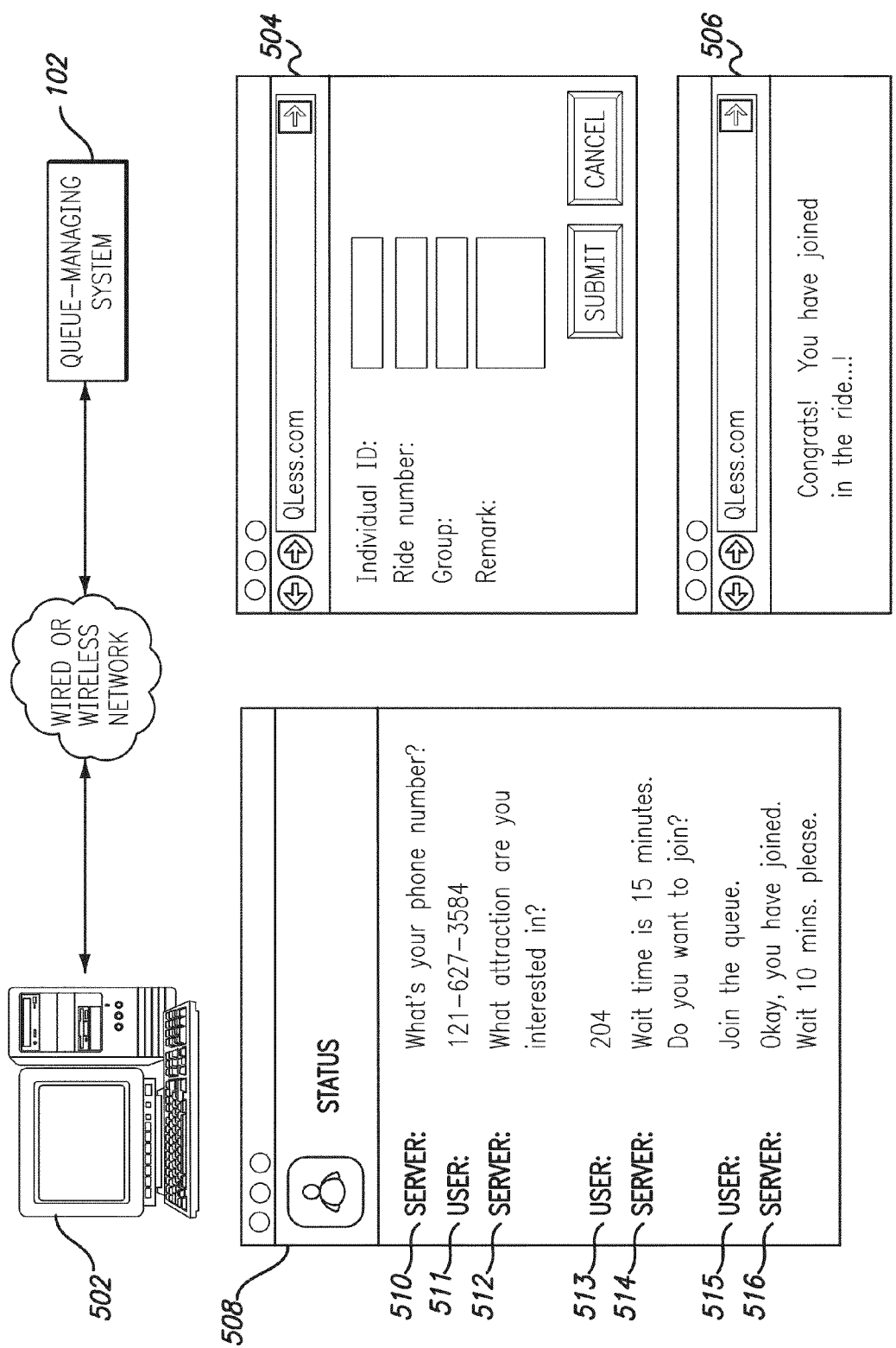
FIG. 5 depicts communications between the queue-managing system and an individual computer.

Another embodiment of the communication between the cell phone (302) and the queue-managing system is an interactive voice response (IVR) system (318). FIG. 4 shows a general operation of the IVR system. The cell phone (302) calls (401) the queue-managing system (102). The cell phone (302) is identified to the queue-managing system (102) by the Caller ID information contained in the call (401). The queue-managing system (102) sends a pre-recorded or automatically generated voice message (402) to prompt for input of the identification number of the virtual queue, if multiple queues are available within that menu. The virtual queue identification number is then keyed in (403) by the cell phone (302), if multiple queues are available within that menu. The queue-managing system (102) may then confirm (404) that the virtual queue identification number has been keyed in (403). The queue-managing system then sends a second set of pre-recorded automatically generated voice messages (405) to announce the wait time for that queue and prompt for the individual's request of entering the virtual queue (or leaving, changing positions, or changing notification method, if the person is already in a queue), thus reporting the status of the virtual queue.

The request is then keyed in (406) on the cell phone (302), and the queue-managing system (102) processes the request, updates the virtual queue, and responds accordingly (407). The cell phone (302) can now disconnect the call (408). Periodically, the queue-managing system (102) can optionally call (409) the cell phone (302) using the Caller ID number previously received (401) or an alternate number entered by the caller. The queue-managing system (102) sends an automated voice message (410) notifying the cell phone (302) user the information regarding the status of the virtual queue. The person can then disconnect the call (411).

Another embodiment of the individual-end device communicates with the queue-managing system (102) through an electronic button connected to the Internet or another communications network (318). Each button can be associated to a location (e.g., a user's table or desk) or a user, and the button can alert the queue management system with when and who needs service. Such buttons can also convey the type of service needed through multiple buttons or controls.

Another embodiment of the individual-end device (106) is a computer (502) or some similar electronic device having an internet connection, and a web browser or an application or an instant messaging client. Communications between the individual computer (502) and the queue-managing system (102) can go though wired or wireless internet connection.

An embodiment of the communication between the individual computer (502) and the queue-managing system (102) can be a web-based interface (504). The individual uses a web browser and opens up the webpage (504) provided by the queue-managing system (102). The individual inputs an individual identification number, the virtual queue identification number, a request and other relevant information. The individual then submits such information through the web browser to the queue-managing system (102). The queue-managing system (102) processes the information, updates the virtual queue, and responds accordingly through an updated webpage (407).

Another embodiment of the communication between the individual computer (502) and the queue-managing system (102) is instant messaging (508). The individual opens an instant-message client and initiates a chat with the queue-managing system (102). The queue-managing system (102) may send a message to the individual for his identification number (510), or use his instant message identification (IM ID). The individual may then respond with his identification number (e.g., his phone number) (511), or simply use his IM ID. The queue-managing system (102) asks for the virtual queue identification string (512). The individual responds (or initiates the interaction) with the virtual queue identification string (513). Optionally, the queue-managing system (102) asks what the individual wants to do (514). In one embodiment, the individual is assumed to want to join the queue when he sends the queue identification string. In another embodiment, the individual sends a code for his request (e.g., J for joining the virtual queue). In a third embodiment, the individual responds with his request, for example, the current wait time (515). The queue-managing system (102) processes the request, updates the virtual queue, and responds accordingly (516). At this point, the individual can stop the chat or send another request to the queue-managing system (102).

Another embodiment of the communication between the individual computer (502) and the queue-managing system (102) is by way of a computer application (app) running on a standard computer, a tablet, a phone or any device.

Another embodiment of the communication between the individual computer (502) and the queue-managing system (102) is by way of speech recognition by a computer of speech by the user.

Figure 6:
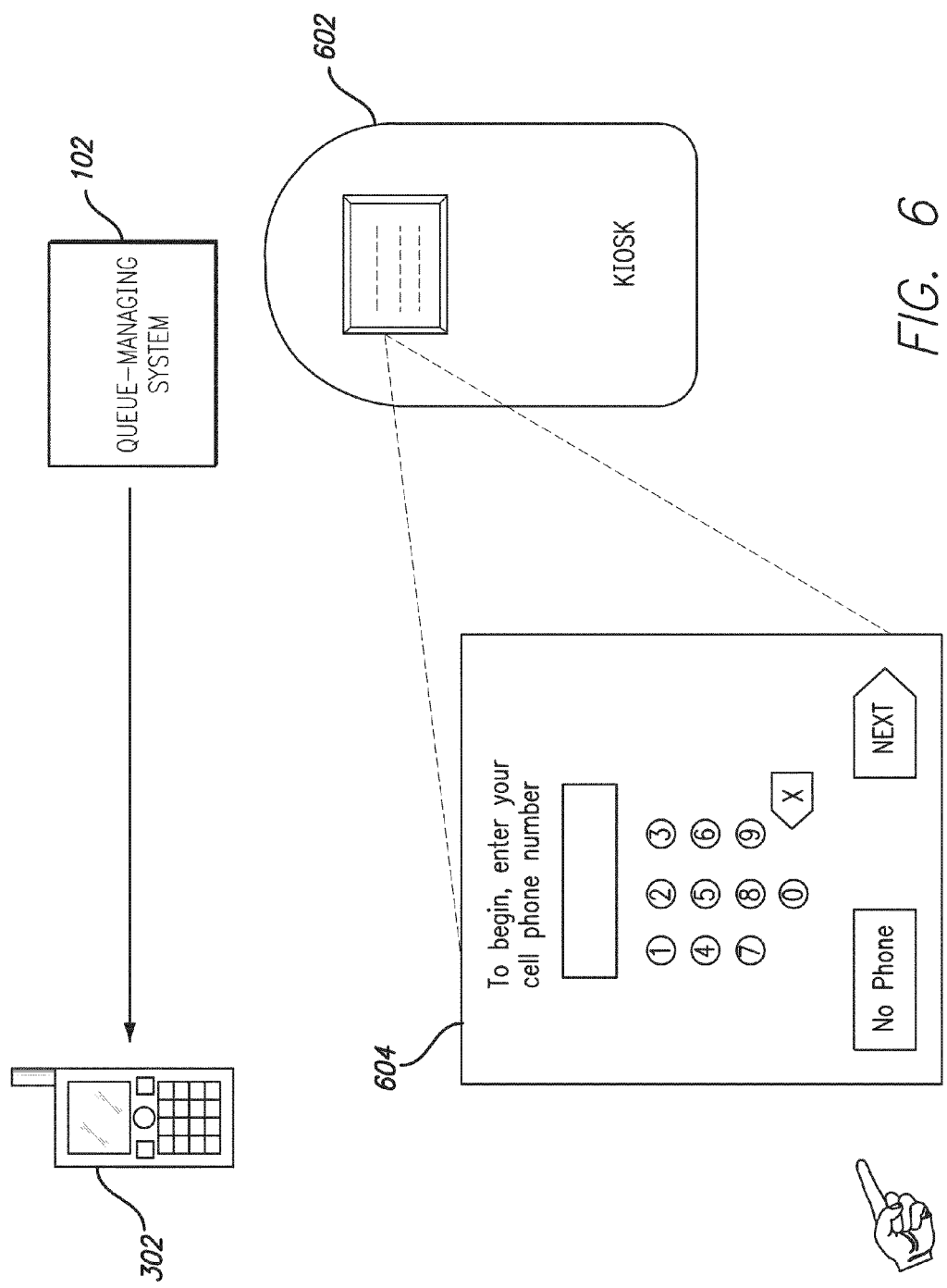
FIG. 6 depicts communications between the queue-managing system and a kiosk electronic device.

Another embodiment of the individual-end device (106) is a kiosk electronic device (602), shown in FIG. 6, that communicates with the queue-managing system (102) through wired or wireless internet connection or a dedicated data connection. An example of the kiosk uses a touch-panel and a display. The individual can enter his individual identification number, select the virtual queue he/she wants to join and complete his request. He can also enter any other relevant information by following the prompts on the screen and touching the screen (604). The kiosk sends all the information to the queue-managing system (102). The queue-managing system (102) processes the request, updates the virtual queue, and sends notifications or information to the kiosk (602) or another individual-end device, for example, a cell phone (302).

B2. Requests from the Individual to the Queue-Managing System

An individual can send many types of requests to the queue-managing system (102) via an individual-end device (106). An individual who wants to join a virtual queue can send a request to join a particular virtual queue via the individual-end device (106). An individual can select the form of communication the queue-managing system uses to notify him, including SMS messages and phone calls via the individual-end device (106). An individual who wants to join multiple virtual queues can send a request to join multiple virtual queues via the individual-end device (106).

An individual who wants to join a virtual queue can send additional information along with a request to join a virtual queue to accommodate specific needs (e.g., wheelchairs, high chairs, language requirements, preference for particular service agents, etc.) via the individual-end device (106). In some embodiments where the individual has specific needs, the queue-managing system can be further configured such that the individual with the specific need is summoned only when the entity's staff having the specifically needed skill is available. By way of example, and not of limitation, if the individual can only speak Spanish, then that individual is summoned only when an entity's Spanish speaking staff member is available; or if the individual is handicapped, then that individual is only summoned when a wheelchair-accessible service window is available. An individual who wants to join a virtual queue can purchase a right of priority that places the individual in a particular position or some other position in a particular virtual queue or multiple virtual queues via the individual-end device (106). An individual who wants to join a virtual queue can send requests for updated information regarding a particular virtual queue, such as current position in the queue, current wait time, etc, via the individual-end device (106). An individual who wants to join a virtual queue may reserve a particular position in a particular virtual queue at a specific time, via the individual-end device (106).

An individual who has obtained a position in a virtual queue can send a request to swap positions with another individual who has also obtained a position in the virtual queue via the individual-end device (106). Such swap can involve one individual paying the other individual to swap positions. An individual who has obtained a position in a virtual queue can send requests for updated information regarding a particular virtual queue, such as average wait time, current position in the queue, current wait time, etc, via the individual-end device (106). An individual who has obtained a position in a virtual queue can send a request to stay at a particular position in the virtual queue for a prolonged time via the individual-end device (106). An individual who has obtained a position in a virtual queue can send a request to abandon his position in the virtual queue and therefore leave the queue via the individual-end device (106).

An individual who has left a particular virtual queue or whose turn expired after reaching the front of the queue can send a request to rejoin the virtual queue, within a certain period of time after expiration, in a position near where the individual left the queue via the individual-end device (106). An individual can be provided a custom vanity toll-free phone number to send requests to the queue-managing system (102). An individual can request for a first available position in multiple virtual queues within a single entity or across multiple entities. Under a first-available-queue mode, the individual will be assigned to multiple virtual queues within an entity or multiple queues across entities. When the individual reaches the front of one of the multiple queues, the queue-managing system (102) will automatically summon the individual to that particular queue and remove the individual from the other queues. Under the first-available-queue mode as well as under other modes, an individual may send requests for more time via the individual-end device (106), and the queue-managing system (102) will automatically add more time to each position the individual has obtained in multiple queues.

B3. Notifications from the Queue-Managing System to the Individual

The queue-managing system (102) can send several types of notifications to the individual-end device (106) to respond an individual's request or to inform the individual an updated status of the virtual queue. The queue-managing system (102) can send an updated status of a particular virtual queue to the individual-end device (106), automatically, periodically, or in response to an individual or an entity's request. The queue-managing system (102) can automatically send updated status of a particular virtual queue to the individual-end device (106) when certain types of changes occur in the virtual queue, such as a significant decrease or increase in wait time. If the notification requires a reply by the individual, the queue-managing system (102) can periodically resend a notification to the individual-end device (106) until the individual responds. The queue-managing system (102) can periodically resend a notification to multiple individual-end devices (106) in different forms of communication (e.g., text messaging, phone call, instant messaging, web pages, etc.) until the individual responds.

The queue-managing system (102) may send updated status of a particular virtual queue to the individual-end device (106) when the entity managing the actual queue enters new information or modifies the actual queue. The queue-managing system (102) may send summons notifications along with additional information, including assigned table, room number, store location, counter, etc, to the individual-end device. The queue-managing system (102) can send different types or levels of notifications to the individual-end device (106) according to the individual's position in the virtual queue (e.g., far from the front, near the front, at the front of the virtual queue).

When an individual is moved from one virtual queue to another virtual queue, the queue-managing system (102) can send a notification to the individual-end device (106) to inform the individual of this change and the reason why he is moved to another queue. When a party of individuals as a whole enters a particular virtual queue, the party can specify multiple individual-end devices, and the queue-managing system (102) can receive requests from and send notifications or responses to each of the specified individual-end devices.

The queue-managing system (102) can send a confirmation notification to the individual-end device (106) in response to the individual's request of reservation. When an individual decides to leave or not to enter a particular queue because the estimated wait time is too long, the queue-managing system (102) can send a notification and an updated status of the virtual queue to the individual-end device (106) within a certain period, for example, if the wait time forecast decreases significantly.

C. The Entity-End Device and Communication Between the Entity-End Device and the Queue-Managing System
C1. Implementation of the Communication Between the Individual-End Device and the Queue-Managing System An embodiment of the entity-end device (110) is a computer (702), shown in FIG. 7, or some similar electronic device that has an internet or cellular connection. Communications between the entity computer (702) and the queue-managing system (102) can go though the internet connection, wired or wireless.

A further embodiment of the entity-end device is a computer or some similar electronic device that has an internet connection and a non-physical-keyboard input interface, such as a touch panel.

A further embodiment of the entity-end device is a computer or some similar electronic device that has Internet connection and sensors monitoring the status of the actual queue. An example of the sensor is a door sensor. When an individual passes through a door and is served, the sensor sends notification back to the queue-managing system (102) and the queue-managing system (102) updates and processes the virtual queue accordingly.

An embodiment of the communication between the entity computer (702) and the queue-managing system (102) is a web-based interface (704). The entity uses a generic web browser and opens up a webpage (704) provided by the queue-managing system (102). The entity can input the information about the status of the actual queue thorough the webpage (704). The queue-managing system (102) processes the information, updates the virtual queue, and responds accordingly through an updated webpage.

Another embodiment of the communication between the entity computer (702) and the queue-managing system (102) is a third-party application that uses a set of web application programming interfaces (API) to communicate with the queue-managing system. An example of the third-party application is a common cash register program.

Figure 7:
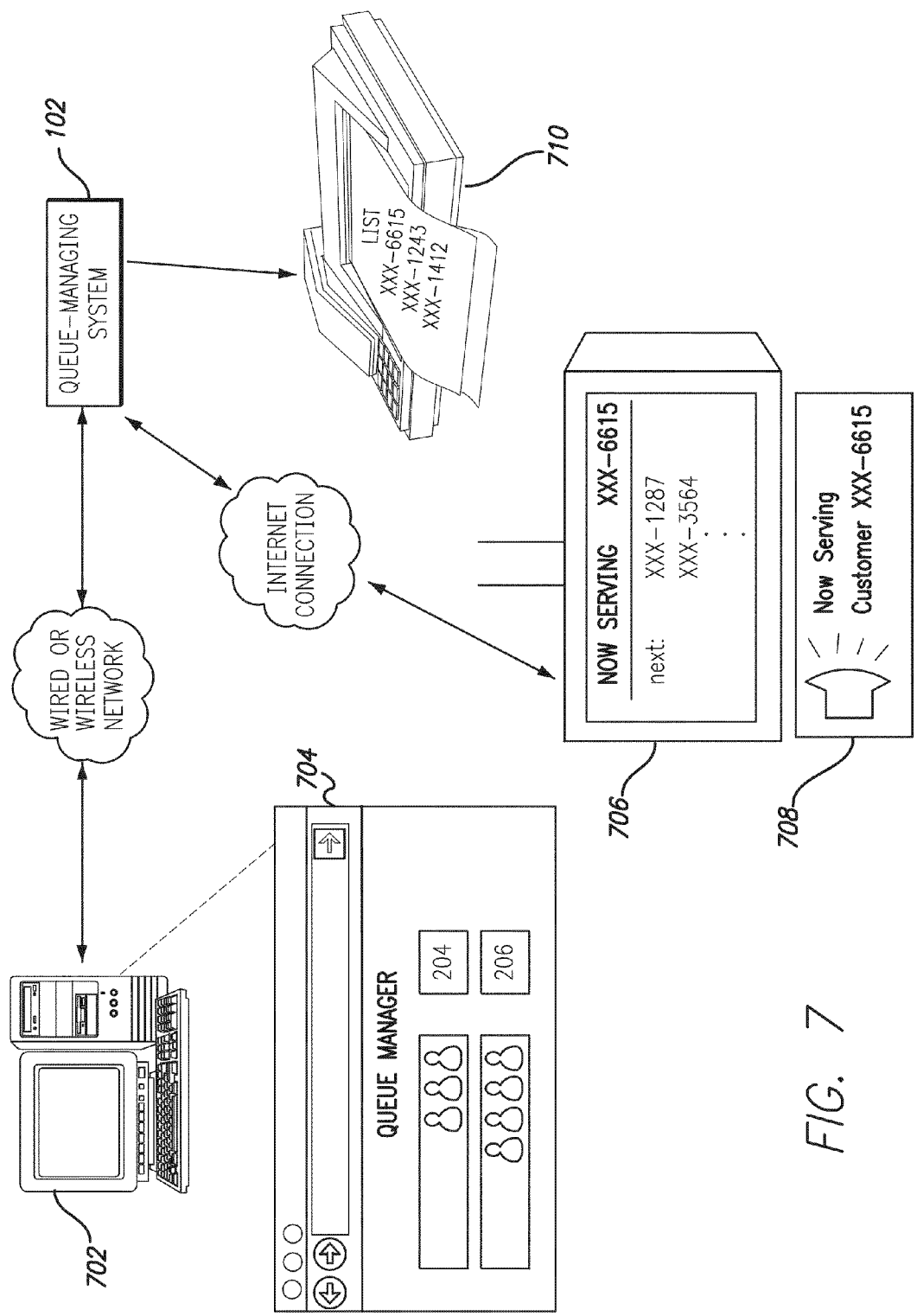
FIG. 7 depicts communications between the queue-managing system and entity-end devices.

Another embodiment of the entity-end device (110) is a customer-facing monitor (706), shown in FIG. 7, or some similar electronic device that has an internet connection. Communications between the customer-facing monitor (706) and the queue-managing system (102) goes though the internet connection, wired or wireless. The customer-facing monitor automatically and periodically receives data from the queue-managing system (102) and notifies individuals both visually and audibly. An example of such notifications is displaying the individual being served and the individuals that will be served next. Another example of such notification is playing audible messages (708) to summon the individual in the front of the virtual queue.

Another embodiment of the entity-end device (110) can be a fax machine (710), shown in FIG. 7, or some similar electronic device that is capable of faxing. Communications between the fax machine (710) and the queue-managing system (102) goes through a telephone line. The entity may obtain information about the status of the virtual queue via the fax machine (710), including a list of individuals enlisted in the queue. The fax machine may serve as a backup communication in case of internet connectivity problems.

Another embodiment of the entity-end device (110) integrates with the private branch exchange (PBX) system to intercept callers that simply want to join the virtual queues.

Another embodiment of the entity-end device (110) can be a phone, which can be configured to send text messages to have the queue management system, for example, summon the next individual-end device.

C2. An Entity's Operation on a Virtual Queue

An entity may perform multiple types of operations on the virtual queue via an entity-end device (110). An entity may search individuals enlisted in the virtual queue based on a set of criteria via an entity-end device (110). An entity may add call-ahead individuals into the virtual queue via an entity-end device (110), who can be skipped once they get to the front of the queue, until they are marked as arrived. An entity may summon an individual out of the queue through the one-click interface on an entity-end device (110). Individuals can be summoned in any order desired by the entity, for example, a first come first serve order, or in any order so-determined by the entity (e.g., an entity can summon any individual out of order). An entity may manually enable or disable a virtual queue via an entity-end device (110). When a virtual queue is enabled, individuals may request to join the virtual queue via an individual-end device (106). When a virtual queue is disabled, no individual may join the virtual queue via an individual-end device (106).

An entity may input forecast wait or other information relevant to the virtual queue via an entity-end device (110) and the queue-managing system (102) will send notifications of such updates to individual-end devices (106). An entity may choose to automatically have the queue management system notify every individual-end user behind a particular user of a change in a forecast. The queue management can automatically compute how each subsequent end-user's wait forecast changes after a manual change is introduced for one individual-end user's forecast. An entity may move an individual from one virtual queue to another via an entity-end device (110). An entity may obtain lists of individuals in multiple virtual queues via an entity-end device (110). An entity may obtain the immediate history of a particular individual in a virtual queue via an entity-end device (110). An entity may obtain analysis reports of individual behaviors in a single virtual queue, or across multiple virtual queues via an entity-end device (110). The analysis reports may be displayed on the entity-end device (110), exported to files in different formats (e.g. spreadsheets), or exported to a local database. An entity may view individuals' actions in real time through a graphical interface on an entity-end device (110).

D. The Queue-Managing System and its Functions

An embodiment of the queue-managing system (102) is a computer that is capable of receiving and sending information through text messaging, instant messaging, web pages, fax, and/or an IVR system.

The queue-managing system (102) stores virtual queue data and updates them according to information or request from entities or individuals. The queue-managing system (102) also sends information or notifications to entity-end (110) or individual-end (106) devices automatically or in response to request from entity-end (110) or individual-end (106) devices. In addition, the queue-managing system (102) can build a database of individual phone numbers. The queue-managing system (102) can protect customer privacy by sending only partial phone numbers to the entities. The queue-managing system (102) may keep names and/or notes about individuals across entries in multiple queues. The queue-managing system (102) may direct individuals to specific locations when summoned (window numbers, dining rooms, etc.). The queue-managing system (102) may give employees of the entity specific restricted access through role-based privileges to simplify their user interfaces.

The queue-managing system (102) can maintain a fixed-size summoned customer pipeline by automatically summoning one customer every time another customer is marked as arrived. The queue-managing system (102) can automatically roll individuals in a virtual queue from one day to the next. When an individual is being served at another actual queue, the queue-managing system (102) will not summon him to another queue. The queue-managing system (102) may consider travel time between actual queues and adjust travel time based on an individual's past speed. The queue-managing system (102) may change available queue options dynamically based on individual party size and special needs.

The queue-managing system (102) can move individuals from one queue to another automatically at a scheduled time. The queue-managing system (102) can support classifiers in an auto-summon-by-list-size mode such that individuals can be automatically summoned based on a specific classifier. Classifiers are attributes of a party or individual. The queue-managing system (102) may recognize an individual's phone number through caller ID and automatically place the individual in the virtual queue, thus eliminating individuals from having to input their phone numbers. The queue-managing system (102) can have a local backup copy of the system database at the entity-end device (110) in case of internet breakdowns.

The queue-managing system (102) can automatically advance the virtual queue and summon the next individual at the front of the virtual queue at a specified rate, or in response to an event, such as a summoned person leaving the queue, their turn expiring after a predefined interval of time, a summoned person pushing themselves back, etc. The queue-managing system (102) can automatically, periodically, or in response to the individual's or an entity's request, calculate and send notifications of forecast wait time to individual-end devices (106). When the actual real-time forecasted wait time becomes less than a specified value (which can vary by the entity and by the individual), the queue-managing system (102) sends notification to individual-end devices (106). The queue-managing system (102) can automatically summon the next party if the first summoned party does not show up. The queue-managing system (102) can close or disable virtual queues automatically based on capacity or when closing time approaches.

The queue-managing system (102) may track individual party sizes. The queue-managing system (102) also provides a dynamically-adaptive schedule mode. In such mode, an individual can request for a position in a queue around a desired time. When the scheduled time approaches and the individual or the entity is not available, the queue-managing system will automatically expire or postpone the individual's position in the virtual queue and call upon the next available individual. The queue-managing system can automatically assign an individual to another virtual queue when requested by the individual to join a particular queue, or after the individual is summoned and served, according to a set of rules.

Figure 8:
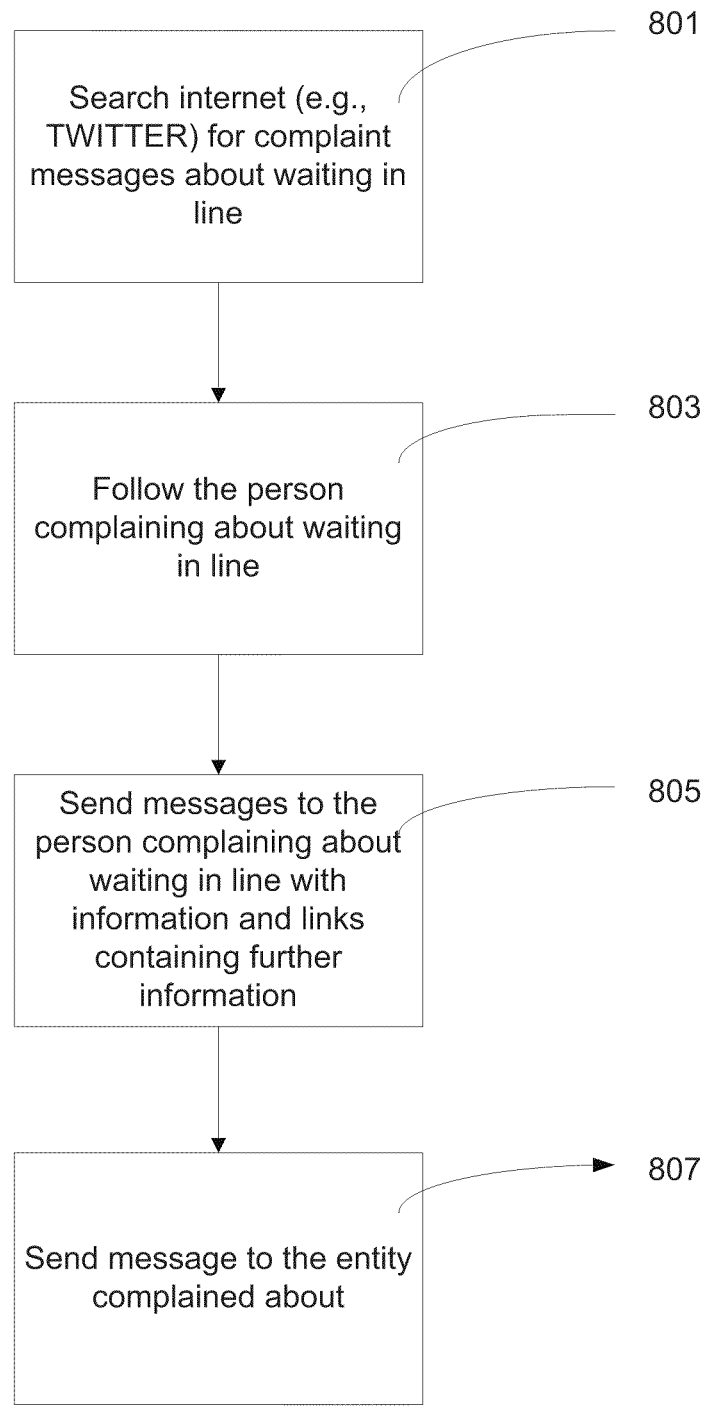
FIG. 8 depicts an exemplary method of searching in the internet for potential users of the queuing system.

According to an embodiment of the present disclosure as show in FIG. 8, the queue-managing system (102) can automatically and periodically search the Internet for messages from Internet users who might be complaining about waiting in line (801), or writing about any particular topic, or mentioning any of a set of strings. When the queue-managing system (102) finds such messages, the system can automatically respond to their messages, for example by introducing the queue-managing system (102) of the present disclosure. By way of example and not of limitation, the queue-managing system (102) can periodically search TWITTER® pages for users posting messages with complaints regarding waiting in line. When the queue-managing system (102) finds a user who might be complaining about waiting in line, the queue-managing system (102) uses a TWITTER® account to "follow" (803) that user and further informs (805) that user of the queue-managing system (102) of the present disclosure. The TWITTER® account can contain information and links to direct an interested person to a website containing further information about the electronic queuing system of the present disclosure. The system can also be configured to identify a corresponding email or social network account, (e.g. for the institution where the queue complain was about), and notify them of their customer's complaint and a possible solution.

In yet a further embodiment, the queue-managing system (102) posts a message in response to the user's complaint. The response contains information regarding the electronic queuing system of the present disclosure. The queue-managing system (102) can search the internet for specific messages and respond to them according to a set of rules. The set of rules can be defined to direct interested persons to websites related to the electronic queuing system of the present disclosure.

In another embodiment, the queue-managing system (102) lets individuals post a message on a social network to indicate that they are joining a queue, with a link allowing their friends or followers to join them. In one embodiment, the link allows their friends to join the queue at the same position as the poster, expanding the party size accordingly.

Figure 9:
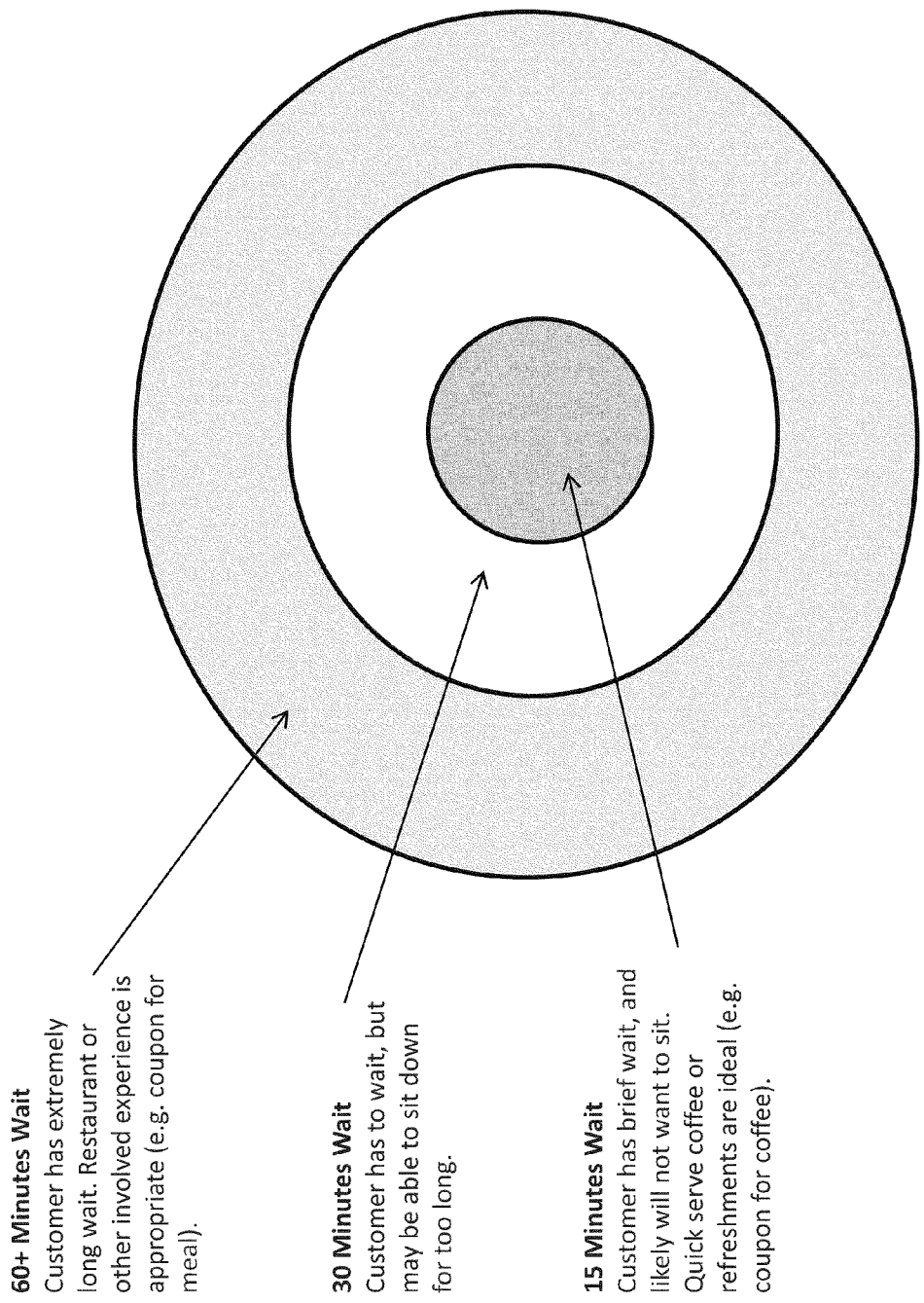
FIGS. 9-10 depict exemplary models for advertising using the queuing system.

According to an embodiment of the present disclosure, the queue-managing system (102) can automatically and periodically send advertisement messages to an individual-end device (106) according to a set of rules for a person already in a queue. The set of rules can be defined such that the advertisement messages depend on the end device user's estimated wait time as shown in FIG. 9. For example, when a person has an estimated wait time less of than 15 minutes (901), the person may not be interested in activities of extended duration such as sitting down for a meal. In such case, the queue-managing system (102) can send advertisement messages, for example, regarding a quick coffee or refreshment. The advertisement messages can advertise for retail stores in the nearby vicinity that a customer can quickly attend and return within the estimated wait time. Ads can also take into account the previous history of the user and what establishments he/she has queued for, as well as the location corresponding to their phone number, the frequency of visits to each establishment, the time since their last visit, and more.

When a person has an estimated wait time of approximately 30 minutes (903), for example, the person may be able to sit down for services for a short while. The queue-managing system (102) may send advertisement message about fast-food restaurants, light rails, etc. The person may be able to drive, but the driving time/distance should be short (e.g., less than 5-minute drive).

When a person has an estimated wait time that can exceed, for example, more than one hour (905), the queue-managing system (102) can send the person advertisement messages concerning involved experiences, such as sit-down restaurants, car dealerships, etc. The person would have sufficient time to go further, thus the advertisement message may cover a targeted interest retailer.

Figure 10:
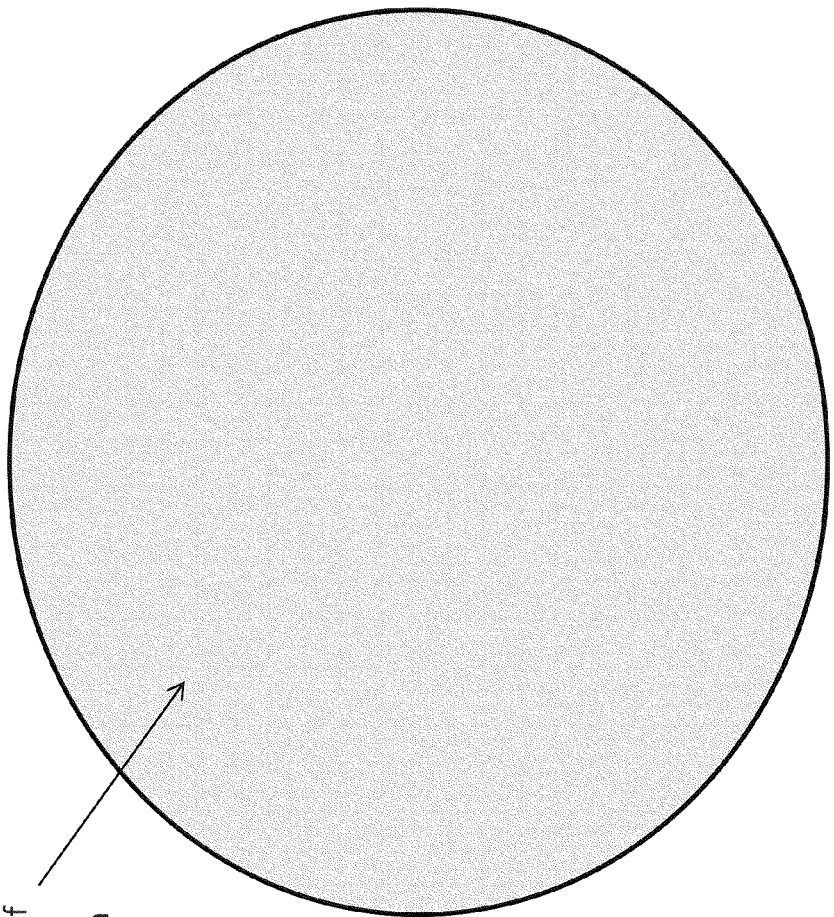
Figure 11:
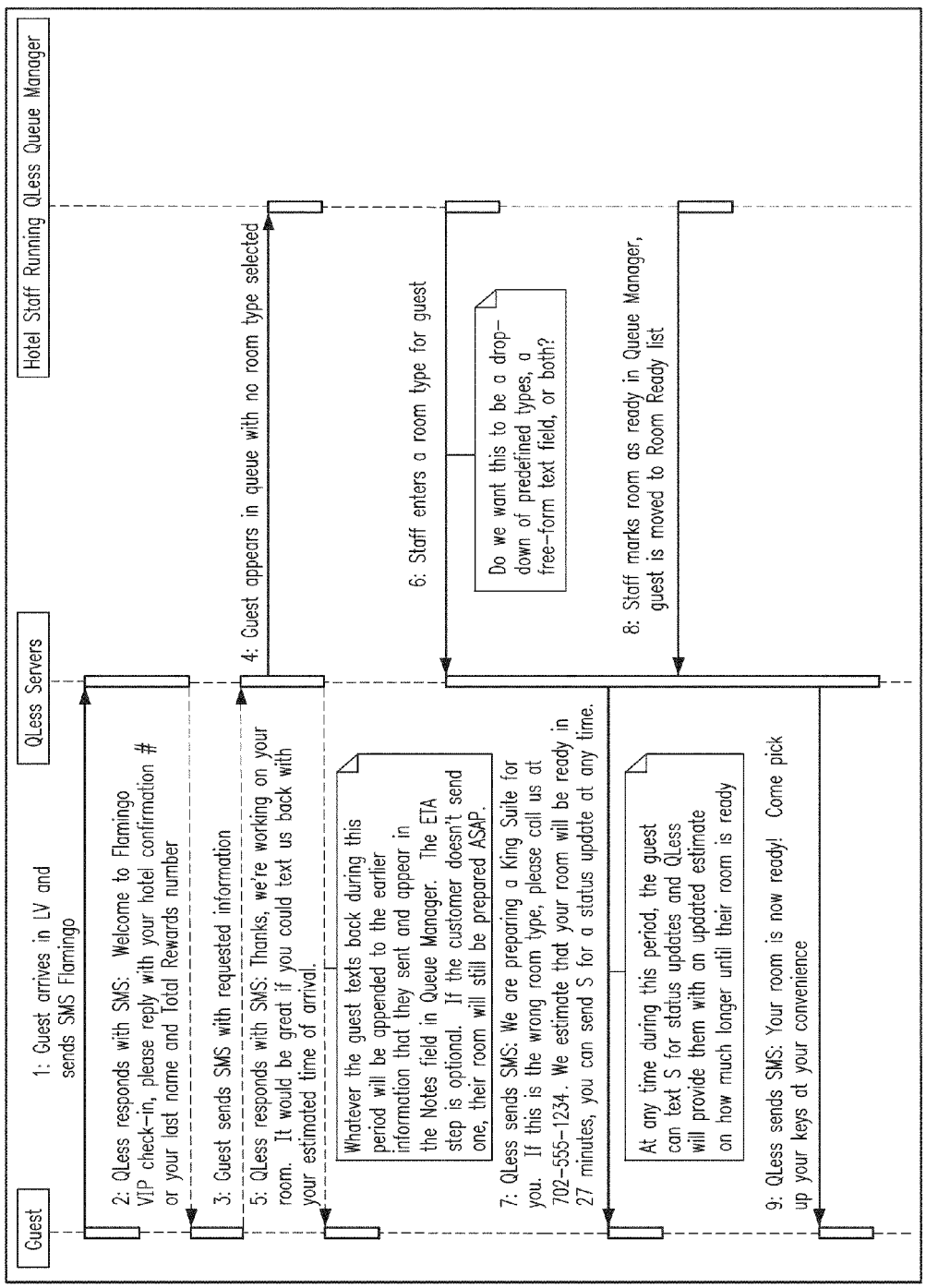
FIG. 11 depicts an exemplary implementation of the queuing system in a hotel room availability notification system.

According to an embodiment of the present disclosure as shown in FIG. 10, frequency in which the entity-end device (110) displays advertisement messages can depend on the length of the queue. For example, on a busy day with a long queue, the entity-end device (106) can cycle through advertisement messages at a faster rate. On a less busy day with a short queue, the entity-end device (106) can cycle through advertisement messages at a slower rate. Charges for to an advertiser for advertisement messages can also depend on the queue-length. For example, advertisement messages for a long queue can be more expensive than those for a short queue due to the amount of users that may be exposed to such advertisement messages.

E. Exemplary Use of Queuing System

The embodiments of the queuing system of the present disclosure can be used by hotel management in a hotel room availability notification system. Hotels typically have a fixed earliest check-in time for arriving guests. This is to ensure previous guests that were occupying the hotel rooms have checked-out and that the hotel staff has had time to clean and prepare those rooms for the next guests. However, such fixed earliest check-in times could be made dynamic and updated on a real-time basis so that arriving guests can possibly check-in earlier if their rooms are available, or not have to show up until later if their rooms will be delayed. The system can thus minimize the hotel staff manpower needed by reducing peak attendance.

By implementing an embodiment of the automated virtual queuing system, an exemplary process can comprise a sequence of events as follows. A guest anticipating to arrive at a hotel can send an SMS text message to the hotel's queue-managing system anticipating their arrival. The queue-managing system can reply back to the arriving guest asking them to respond via SMS text message with identifying information such as their name, confirmation number or a rewards membership number (unless this information was sent in the first text message or communication by the guest). The guest can then reply with such information and a hotel staff will see that an arriving guest will be checking in soon. The hotel staff or hotel management system will determine the type of room (e.g., king suite, non-smoking, presidential suite, standard room, etc.) the guest should be check-in to. Meanwhile, the queue-managing system can reply back to the guest to ask them to provide their estimated time of arrival (ETA). It is optional for the guest to provide this information but ETA information will assist the queue-managing system to place them in appropriate precedence in the virtual queue as they wait for their hotel rooms. If ETA information is not provided by the guest, the guest will be placed in the next available place in the virtual queue and their room may be prepared immediately. At this point, the queue-managing system can send another SMS text message to the guest with confirmation of the room type assigned, their estimated wait time or personalized check-in time, and optionally a phone number where the guest can call to make any last minute changes and/or corrections to the reservation.

Room availability status is updated by the hotel staff once the previous guests have checked-out and the room is cleaned. Once the room is marked as being available and ready for the next guest, the queue-managing system can send another SMS text message to the arriving guest to inform them that their room is ready. In cases where the wait time exceeds a specified amount of time, the queue-managing system can send wait-time updates via further SMS text messages. When the guest physically arrives at the hotel, the guest can pick up their room key at their convenience.

In yet a further example of the embodiments of the present disclosure, an individual can bid for preferred positions in the virtual queue. When the individual joins a virtual queue by one of the methods described in the present disclosure, the individual is provided an opportunity to purchase a better (e.g., closer to front of the line) position in the virtual queue. The process starts with the purchaser offering to pay a certain amount of money for the better position. The queue-managing system relays this offer to an individual who is in the front of the line in the virtual queue if they are interested in selling their position for a specified price. If the individual at the front of the line is willing to sell their position for the offered price, the queue-managing system will ask the purchaser to confirm the bid. If the person at the front of the line declines, the next person in line is offered to sell their position.

Once the seller and the purchaser both agree, either the purchaser's cell phone bill can be charged for the offered price or the purchaser's credit account. The seller can either receive credit to their cell phone bill or receive credit to their credit account.

In a further embodiment, the bidding system can generate revenue to both the seller, the merchant using the queuing system, and the queuing system provider. By way of example and not of limitation, the seller does not receive the entire amount of the purchaser's bid. Instead, a portion of the purchasing price can be provided to the merchant and another portion can be provided to the queuing system provider. Finally, the seller receives the remaining portion of the purchaser's bid price. Such method of dividing the revenue can potentially allow the merchant to obtain the queuing system either at a reduced cost or for free since the queuing system provider can generate revenue through the bidding method.

In yet a further embodiment, implementing the bidding method can attract individuals to the virtual queue for the sole purpose of selling their positions in the virtual queue. In order to avoid misuse of the queuing system, the queue-managing system can be designed to ensure 'no-shows' are not allowed to participate in the bidding process. However, they might still be allowed to join their virtual queue for their own use. In another embodiment, repeated no-shows might be penalized in their position in the queue to discourage repeated no-shows.

In another embodiment, priority or expedited service may be provided to a class of users. By way of example, and not of limitation, those who pay a convenience fee for expedited service, or frequent customers based on a database or the number of times they have been served by the queue management system in that establishment in the past.

In another embodiment of the present disclosure, a dynamic reservation can be used in conjunction with the queuing system. In a dynamic reservation system, individuals can make a reservation time for a particular event (e.g., entrance to a museum, restaurant, etc.) by communicating with the queue-managing system, for example by way of either a cell phone or printing a physical ticket either online from home or an on-site kiosk. The event can also accept individuals who 'walk-in' without reservation. In such situations, individuals with reservations and the walk-ins can be integrated with the individuals in the virtual queue so that a certain amount of each group can be admitted. The specific amount to be admitted can change depending on a number of reservations made that day. For example, on days when less reservation are made, more walk-in can be admitted, and vice versa, thus maximizing total throughput of the number of guests.

In yet a further embodiment of the joint queue-managing system and dynamic reservation system, when a reservation time for an individual is delayed, the individual can be informed of the delay and the expected delay time prior to the individual's arrival, thus minimizing inconvenience. Conversely, if the individual who made the reservation is delayed and cannot arrive at the previously assigned time, then the individual can inform the queue-managing system to request additional time. The joint queue-managing system and the dynamic reservation system can coordinate the changes in real-time to keep the flow of traffic moving, thus maximizing throughput. By keeping track of the actual times and lengths of appointments, the dynamic reservation system can maximize throughput while minimizing wait times by notifying users when they are actually likely to be served rather than using fixed-length fixed-time appointments.

In yet a further example embodiment, the queue-managing system can be configured to dynamically and adaptively manage appointments for a specific time/date (e.g., Tuesday at 3 pm) for a given customer. By way of example and not of limitation, in a dynamically managed appointment, if the appointment time is delayed due to delays by the service provider, the queue-managing system can be configured to automatically adjust the appointment times according to the order of booked appointment times. Specifically, if due to delays by the service provider, the 3 pm appointment is delayed to 3:30 pm, then instead of servicing the 3:30 pm appointment at 3:30 pm, the queue-managing system will adjust appointment times as necessary such that the service provider can service the first user in line (in other words, the user that had initially booked the 3 pm appointment) first, before attending to the 3:30 pm appointment. Therefore, the queue-managing system can be configured to manage a combination of a virtual queue and appointment times of variable lengths in a dynamic and adaptive manner.

In one embodiment of the dynamic reservation system, users provide their availability (for example via access to their online calendar, or as a start and end times for availability), and the system gives them a service time in an available period. By promising a range of times rather than an exact time, the system is able to adjust based on real time delays and timing to minimize wait times when users show up.

In another embodiment, the queue-managing system can be used at social gathering events for two or more people to coordinate their meeting at the event. For example, a first person wants to meet with a second person at a particular event. However, the first person and/or the second person may not necessarily know their schedule at the event, and therefore are unable to schedule a specific meeting time and/or location. The queue-managing system of the present disclosure can be used to assist in arranging their meeting by using their cell phones. For example, when the first person is available to meet, the first person can send a text message to the queue-managing system to inform the virtual queue that he is now available. The second person can then be notified by the queue-managing system that the first person is available. Whenever the first person and the second person are both available, the queue-managing system can inform both persons that they can now meet. The system preserves the privacy of each user's mobile phone number while allowing real-time communication between the parties. Multiple users interested in meeting a person can join a virtual queue for that person and get summoned sequentially as the person in question is ready to meet them.

In a social gathering event, there can be hundreds or thousands of people, thus making it difficult for two people to find each other. According to another embodiment of the present disclosure, when the first person and the second person are ready to meet each other, the queue-managing system can assist them in finding each other. In a first method, the meeting location can be pre-arranged such that when they are ready to meet, the first person and the second person goes to the pre-arranged location. In a second method, when the first person or the second person notifies the queue-managing system through their cell phones, they can enter a desired or a suggested meeting location. In a third method, by way of example and not of limitations, at least the first person can have a portable global positioning system (GPS) device (e.g., a cell phone embedded with a GPS), such that the queue-managing system is able to determine the location of the first person according to information obtained from the GPS of the first person and inform the second person the location of the first person. At the coordinated meeting time, the second person can find the first person according to the information provided on his cell phone from the queue-managing system. A smartphone or computer application can direct each person to one another with directions using location information about each user in real-time and mapping data.

According to another embodiment, the queue-managing system can be utilized in a live or virtual Question and Answer (Q and A) session wherein a speaker is answering questions asked by a group of attendees. In an exemplary Q and A session, if attendees have a question that they would like to ask the speaker, the attendees can submit their question by sending a text message with their question from their cell phones to the queue-managing system. At the Q and A session, there can be, for example, a display (e.g., projector) that shows a list of questions that are in queue. As the attendees submit their questions, the questions can be shown in the display for the other attendees to see.

If the attendees desire certain questions to be answered more than the other questions, the attendees can vote for the questions they like by sending a text message to the queue-managing system with the designated code for a particular question. A set of rules can be applied to the queue-managing system such that, for example, the question that has the most votes are given higher priority to be addressed by the speaker. Such rules can be applied in real-time as the Q and A session is taking place.

In a further example embodiment, the queue-managing system can be implemented to be used with call centers. In some situations, call centers can receive more calls than that can be answered by the number of personnel that are available to answer such calls at the call center. Instead of the callers being placed on hold on the phone while the callers wait for their calls to be answered, the callers can be placed in a virtual queue. The callers can join the virtual queue by way of example, calling the call center, sending a text message, or online via the internet. By joining the virtual queue, the caller is able to hang up the phone and still maintain position in the queue. While the caller virtually awaits his turn in line, he can check his status (e.g., expected wait time and/or order in the virtual queue) by way of example, calling, sending a text message or online via the internet. When the caller's turn gets to the front of the queue, the caller receives a phone call which connects the caller with a live person at the call center. The system can require the person who placed the call to respond (e.g., pressing a button) before the call is connected to the attendant to avoid unnecessary waits. If the person who placed the call is not available to take the call at that time, the system can be configured to make a call-back, or the person can push him or herself back in the virtual queue any desired period of time, as outlined above.

In yet a further example embodiment, a customer loyalty program can be implemented in the queue-managing system. For example, when a customer becomes a repeating customer of the virtual queuing system, the queue-managing system can be configured to send a message (e.g., an SMS text message) to the customer once they have used the virtual queuing system more than a preset amount of times. Such message can contain a cardless reward such as a mobile coupon. Moreover, as the customer gets closer to reaching their required number of uses of the virtual queuing system, the queue-management system can be configured to send reminder messages with the remaining number of times that the customer needs to use the virtual queuing system before they earn their next reward.

The examples set forth above are provided to give those of ordinary skill in the art a complete disclosure and description of how to make and use the embodiments of the queue system of the disclosure, and are not intended to limit the scope of what the inventors regard as their disclosure. Modifications of the above described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A method for managing virtual queues adapted to correspond to actual queues, comprising:
  establishing a plurality of virtual queues on an electronic queue-managing system, the virtual queues adapted to correspond to actual queues;
  establishing a bi-directional communication means with an individual who wants to enter, has entered, or has left the plurality of virtual queues;
  establishing a bi-directional electronic communication between the electronic queue-managing system and an entity that manages or provides one or more actual queues according to status of the virtual queues;
  updating the virtual queues according to information received from the individual and information from the entity, wherein the individual requests a first available position in multiple virtual queues within the plurality of virtual queues using the bi-directional communication means;
  summoning the individual to a particular queue once the position of the individual in one of the plurality of the virtual queue reaches the front of the virtual queue; and
  automatically removing the individual from the other virtual queues.

2. The method according to claim 1, wherein the bi-directional communication means with the individual is selected from the group consisting of: a mobile electronic device messaging service system, an internet-based communication system, and an interactive voice response (IVR) system.

3. The method according to claim 2, wherein the internet-based communication system is an information exchange through an app, smartphone, or computer application.

4. The method of claim 2, wherein the electronic queue-managing system is adapted to periodically resend notification messages to the individual's mobile electronic device until the individual is marked as arrived, or until a period of time passes since a first notification expires, if the notification requires a reply.

5. The method according to claim 1, wherein the individual uses the bi-directional communication means to join the one or more virtual queues of the plurality of the virtual queues.

6. The method according to claim 1, wherein the bi-directional communication means further comprises preferences and/or special needs of the individual for particular virtual queues of the plurality of the virtual queues.

7. The method according to claim 1, wherein a position in the virtual queue can be swapped with another position in the virtual queue.

8. The method according to claim 1, wherein the individual can purchase a specific position or priority in the virtual queue.

9. The method according to claim 1, wherein the individual requests a desired amount of additional time in the virtual queue specified by the individual with the bi-directional communication means.

10. The method of claim 9, wherein the queue-managing system automatically moves the individual back a desired amount of time, thereby leaving a next individual or party in a place in the virtual queue formerly occupied by the individual who requested more time.

11. The method of claim 10, wherein the amount of time is determined based on a distance of the individual determined by a global positioning system (GPS).

12. The method according to claim 1, wherein the individual is pre-summoned or notified by the electronic queue-managing system an amount of time selected by the individual or entity, earlier than a time they are forecast to reach front of the virtual queue.

13. The method according to claim 1, wherein the electronic queue-managing system is adapted to send messages of an updated status of a particular virtual queue to the individual's mobile electronic device automatically, periodically, and/or in response to an individual's request, wherein the messages are text messages, voice messages or other electronic communications.

14. The method of claim 13, wherein the individual is able to select between voice messages or text messages.

15. The method of claim 13, wherein the electronic-queue managing system is adapted to alternate sending a voice message and a text message when the individual is unresponsive.

16. The method according to claim 1, wherein the electronic queue-managing system is adapted to automatically send messages of updated status of a particular virtual queue to the individual's mobile electronic device when the wait time of the virtual queue changes by more than a given amount.

17. The method according to claim 1, wherein the entity further comprises an entity computer, the entity computer having a touch panel as an input device.

18. The method according to claim 17, wherein the entity sends and receives information through a third party application using web application programming interfaces (API) to communicate with the electronic queue-managing system.

19. The method of claim 17, wherein the computer further comprises sensors, the sensors monitoring status of the actual queue and the electronic queue-managing system advancing the virtual queue when triggered by the sensors.

20. The method of claim 17, wherein the entity computer displays the individual's partial phone numbers to entity users.

21. The method according to claim 1, wherein the entity can dial an automated line and automatically connect to a fax machine to receive a list of individuals enlisted in the virtual queues.

22. The method of claim 1, wherein the entity uses a private branch exchange (PBX) system, the PBX system being integrated with the entity computer to intercept callers requesting to join the virtual queues.

23. The method according to claim 1, wherein the entity searches individuals enlisted in the virtual queue based on a specified criteria via the entity computer.

24. The method according to claim 1, wherein the entity inputs the virtual queue forecast information to the entity computer and the queue-managing system sends the forecast information to the individuals.

25. The method of claim 24, wherein the electronic-queue managing system is adapted to adjust the virtual queue and the forecast when the individual leaves the queue.

26. The method of claim 24, wherein the forecast is manually updated for a plurality of individuals and the electronic-queue managing system is adapted to notify the individuals simultaneously.

27. The method according to claim 1, wherein the entity obtains analysis reports of the individual's behaviors in one or more virtual queues via a computer.

28. The method according to claim 1, wherein the electronic queue-managing system considers travel time between one actual queue and another actual queue.

29. The method according to claim 28, wherein the electronic queue-managing system adjusts the travel time according to historical travel times of the individual.

30. The method according to claim 1, wherein the electronic queue-managing system changes available queue options dynamically according to the individual's party size and special needs.

31. The method according to claim 1, wherein the electronic queue-managing system automatically calculates and sends notifications of forecasted wait time to the individual.

32. The method according to claim 1, wherein the electronic queue-managing system automatically summons the next party in the virtual queue when the individual is a no-show.

33. The method according to claim 1, the electronic queue-managing system further comprising a multiple-language interface.

34. The method according claim 1, wherein the electronic queue-managing system is further adapted to search an internet for messages comprising complaints regarding waiting in line and responding to the complaint message according to a set of rules.

35. The method of claim 1, wherein the individual is directed to go to specified locations when summoned.

36. The method of claim 1, wherein the electronic-queue managing system is configured to be automatically activated and/or deactivated at predetermined times.

37. The method of claim 1, wherein the electronic-queue managing system is adapted to respond to request by the individual for a status update of the individual's position in the virtual queue.

38. The method of claim 1, wherein the electronic-queue managing system automatically stops accepting individuals from joining the virtual queue as a function of capacity and closing time.

39. The method of claim 1, wherein the virtual queue is a telephonic queue comprising an ability to join the virtual queue from a communication medium selected from the group consisting of: telephone, text message, app, and web browser, and wherein the individual who has entered the virtual queue can hang up a telephone and still maintain a position in the virtual queue.

40. The method of claim 39, wherein after the individual joins the telephonic queue, the individual is able to check status of the telephonic queue at a later time.

41. The method of claim 39, wherein the individual in the telephonic queue is able to delay the individual's position in the telephonic queue.

42. The method of claim 39, further comprising responding to a call-back by the individual in the telephonic queue before being connected with an attendant.

43. The method of claim 39, wherein if the individual in the telephonic queue is unavailable to answer a call-back, the electronic-queue managing system is adapted to call-back the individual later.

44. The method of claim 1, wherein the electronic-queue managing system is adapted to maintain a predetermined fixed number of summoned individuals, whereby the number of summoned individuals are maintained according to the number of individuals that arrive, leave the queue, or become no-shows when the individual's turn expires.

45. The method of claim 1, further comprising tracking an amount of time an individual has become a customer using the electronic queue-managing system, and providing the individual with an incentive to return.

46. The method of claim 45, wherein the incentive is a reward.

47. The method of claim 46, wherein the electronic queue-managing system is adapted to provide reminders to the individual as the individual's next reward level approaches.

48. The method of claim 1, wherein a position in the virtual queue is assigned based on level of priority status of the individual.

49. The method of claim 1, wherein the updating the virtual queues comprises the individual using an electronic button connected to a communications network to alert the electronic queue management system with when and who needs service.

50. The method of claim 1, wherein the updating the virtual queues by the individual comprises sending a code to the electronic queue-management system.

51. The method of claim 1, wherein the updating the virtual queues by the individual is performed with speech recognition by the electronic queue-management system.

52. The method of claim 1, wherein the individual requests a specific need, the individual is summoned by the electronic queue-management system upon availability of a staff that is capable of handling the specific need.

53. The method of claim 1, wherein if the individual leaves the virtual queue, the electronic queue-management system is adapted to notify the individual to rejoin the virtual queue if the wait time forecast decreases by more than an expected amount.

54. The method of claim 1, wherein the electronic queue-management system is adapted to automatically compute all individual's forecast wait times when one individual's forecast wait time changes.

55. The method of claim 1, further comprising sharing a URL provided by the electronic queue-management system such that friends of the individual are able to join the individual in the virtual queue by visiting the URL.

56. The method of claim 1, wherein the electronic queue-managing system is further adapted to send advertisement messages to the individual, the advertisement message content depending on an estimated wait time of the individual in the virtual queues.

57. The method of claim 56, wherein the advertisement message is of a first type if the estimated wait time is less than a specified value, and of at least a second type if the estimated wait time is more than the specified value.

\* \* \* \* \*